US006786106B2

(12) United States Patent
Alley

(10) Patent No.: US 6,786,106 B2
(45) Date of Patent: Sep. 7, 2004

(54) APPARATUS FOR SAMPLING AND TESTING A SPECIMEN

(76) Inventor: Kenneth Alley, Hemlock Ct., Suite 133 F, Deptford, NJ (US) 08096

( * ) Notice: Subject to any disclaimer, the term of this patent is extended or adjusted under 35 U.S.C. 154(b) by 157 days.

(21) Appl. No.: 10/002,313

(22) Filed: Oct. 24, 2001

(65) Prior Publication Data

US 2002/0046614 A1 Apr. 25, 2002

Related U.S. Application Data

(60) Provisional application No. 60/242,915, filed on Oct. 24, 2000.

(51) Int. Cl.[7] .................................................. G01N 1/00

(52) U.S. Cl. .................................................. 73/864.51

(58) Field of Search ......................... 73/863.81, 864.51, 73/864.63, 864.64, 864.81, 864.91; 422/102, 68.01, 61; 604/404, 318; 436/108, 165; 220/506, 526

(56) References Cited

U.S. PATENT DOCUMENTS 3,774,455 A * 11/1973 Seidler et al.
4,927,605 A * 5/1990 Dorn et al.
4,979,402 A * 12/1990 Ryan et al. .............. 73/864.64
5,998,214 A * 12/1999 Guirguis
6,074,606 A * 6/2000 Sayles

OTHER PUBLICATIONS

Copy of brochure for Drug Check screening device; Drug Free Enterprises, Inc.; Scotts Valley, CA (2 pgs.).
Copy from website for Drug Check screening device; Drug Free Enterprises, Inc.; www.drugcheck.com (2 pgs.).
Copies of 3 brochures from Phamatech, Inc.; San Diego, CA; including Pregnancy and Ovulation brochure (2 pgs.); QuickScreen brochure (1 pg.); and ClearChoice brochure (2 pgs.).

* cited by examiner

*Primary Examiner*—Robert Raevis
(74) *Attorney, Agent, or Firm*—Mark A. Garzia, P.C.

(57) ABSTRACT

An apparatus for testing a specimen.

31 Claims, 7 Drawing Sheets

FIG. 2
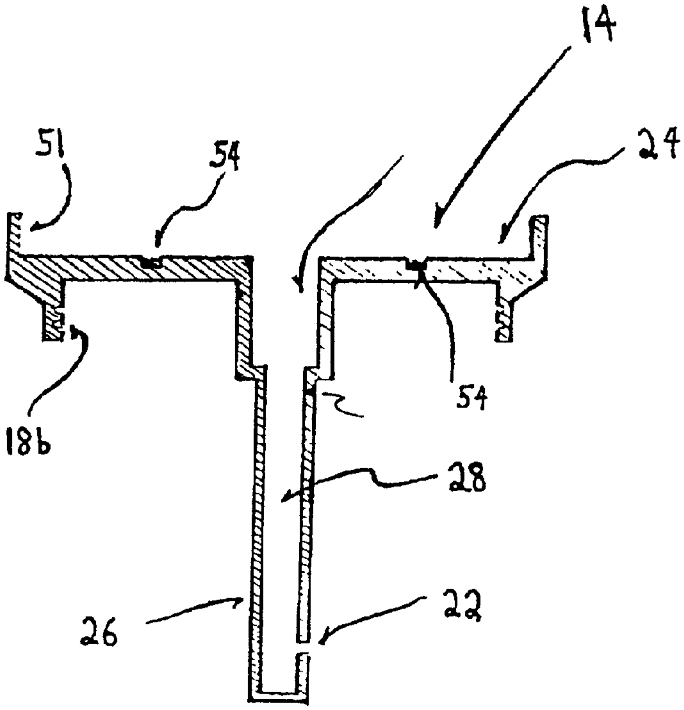
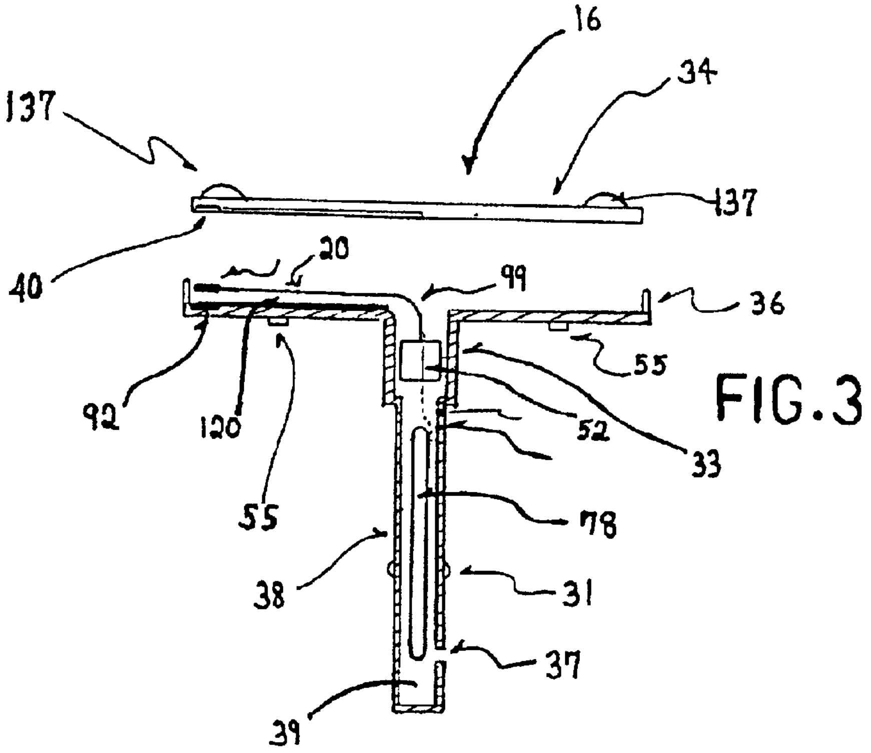
FIG. 3

FIG. 4
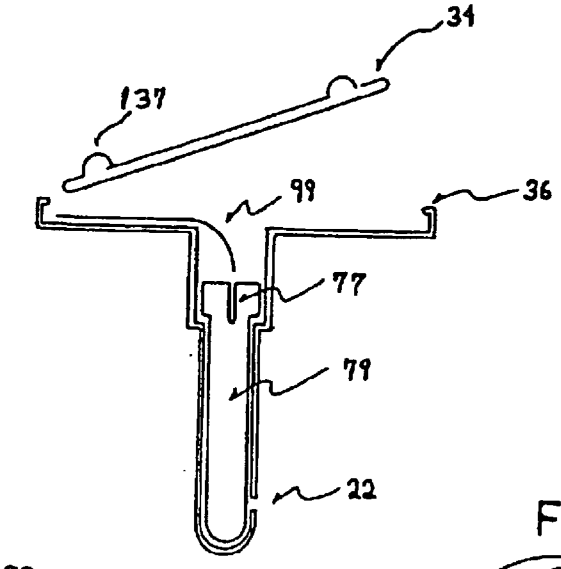
FIG. 7
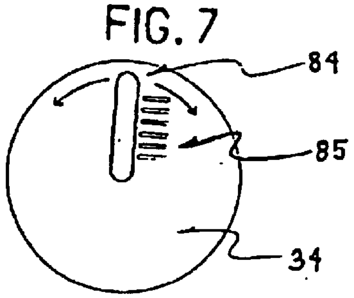
FIG. 5
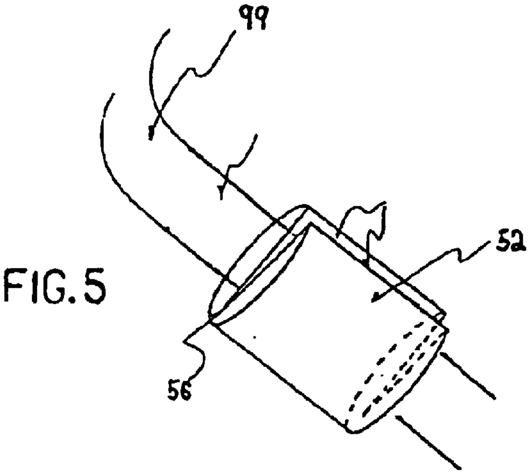
FIG. 6A
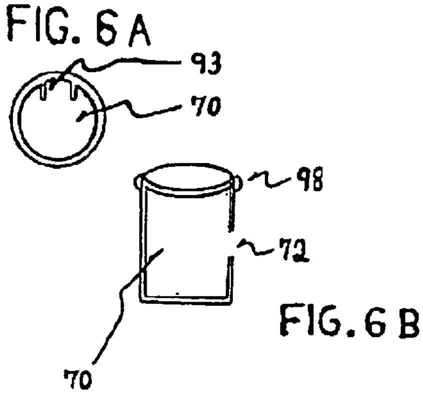
FIG. 6B

APPARATUS FOR SAMPLING AND TESTING A SPECIMEN

CROSS REFERENCE TO RELATED APPLICATIONS

The present application claims the benefit of U.S. Provisional Application No. 60/242,915 filed Oct. 24, 2000, and titled Apparatus for Sampling and Testing a Specimen.

FIELD OF THE INVENTION

The present invention relates generally to a specimen testing apparatus and, more specifically, to a self-contained, tamper-proof system for screening for particular compounds (e.g., drugs and drug metabolites) and/or hormones (as in pregnancy test kits).

BRIEF DESCRIPTION OF THE PRIOR ART

More businesses are requiring new employees to undergo pre-employment drug testing before hiring. Also, post-accident drug testing is almost routine, especially when flammable or hazardous waste hauling is involved, or where the safety of a large number of people are concerned (e.g., oil tanker captain, truck driver or high-speed train engineer). Normally, a urine specimen is taken and tested by a local lab. If the test turns up positive, the specimen must then be sent to a more sophisticated, usually remotely located, testing lab.

In order to ensure that there has been no tampering with the specimen and to prevent contamination of the specimen, several companies have developed self-contained screening devices. These self-contained screening devices usually comprise a specimen container having a screw-top lid and a plurality of reagent test strips suspended around the inner perimeter of the specimen container. The test strips turn a specific color in the presence of particular drug residues.

Home Pregnancy test kits operate in a similar manner. Each pregnancy test kits comprise a test strip designed to turn a specific color or to form a symbol (e.g. a "+" sign) in the presence of a hormone. The hormone appears in a woman's urine only when she is pregnant.

Drug Free Enterprises, Inc., of Scott Valley, Calif., produces a self-contained urinalysis screening device that it markets under the name DRUGCHECK and claims to be able to detect a number of drug metabolites in minutes. Phamatech, Inc. of San Diego, Calif., markets a self-contained pregnancy test kit under the name CLEAR-CHOICE.

SUMMARY OF THE INVENTION

The present invention is a self-contained, tamper-proof screening/testing apparatus. The present invention consists of a container, a closure that snaps or screws onto the container and a cassette holding a rapid test strip that matingly engages with the closure.

A liquid specimen is stored in the container. A series of windows or inlets permit the operator of the testing apparatus to activate the test by inserting the cassette and/or turning the cassette thereby controlling the flow of the liquid specimen to the test strip. This invention is designed for testing a sample specimen in the container without opening the container. Further, the cassette is engaged on to the closure, the test may be conducted without having to physically access the specimen. The container of the present invention can then be mailed to an independent testing lab to confirm the test results without opening the closure, and without pouring the specimen into a new, shippable container. This feature has two important advantages; first, the nurse or other personnel supervising the test is not exposed to the specimen; second, it limits a person's ability to tamper with the specimen, especially if the closure is equipped with a tamper-proof tape.

Besides providing means to physically activate the test when desired, the cassette is designed to allow the sample specimen to be shut off or isolated from the test area after the results are read, thereby preserving the remainder of the specimen.

After a patient has provided a specimen, the container can be sealed with the specially designed closure to prevent tampering and to prevent the accidental spilling of the specimen.

In another preferred embodiment, the closure has a substantially tubular portion that extends into the center of the container. This tubular portion is sized to accept a pipe section of the cassette. The tubular portion may be initially closed-off by a cap thereby forming a second, inner container within the first or original specimen container.

BRIEF DESCRIPTION OF THE DRAWINGS

The foregoing summary, as well as the following detailed description may be better understood when read in conjunction with the accompanying drawings, which are incorporated in and form a part of the specification. The drawings serve to explain the principles of the invention and illustrate embodiments of the present invention that are preferred at the time the application was filed. It should be understood, however, that the invention is not limited to the precise arrangements and instrumentalities shown.

In the drawings:

FIG. 2 is a cross-sectional view of the closure of the screening apparatus shown in FIG. 1 taken along line 2—2;

FIG. 3 is a longitudinal cross-sectional view of the cassette assembly shown in FIG. 1;

FIG. 4 is a cross-sectional view of the cassette or closure having a modified absorbent insert in accordance with the present invention;

FIG. 5 is an enlarged perspective view of a collar used to align the test strip and to apply a controlled amount of pressure on the test strip;

FIG. 6A is an enlarged top view of a plug that may be used to isolate the interior chamber of the closure from the specimen until a desired event (i.e., unlocking the plug when a cassette is inserted);

FIG. 6B is a perspective view of the plug shown in FIG. 6A;

FIG. 7 is a top view of the cassette cover illustrated in FIG. 3;

DETAILED DESCRIPTION OF THE PREFERRED EMBODIMENT

Figure 1:
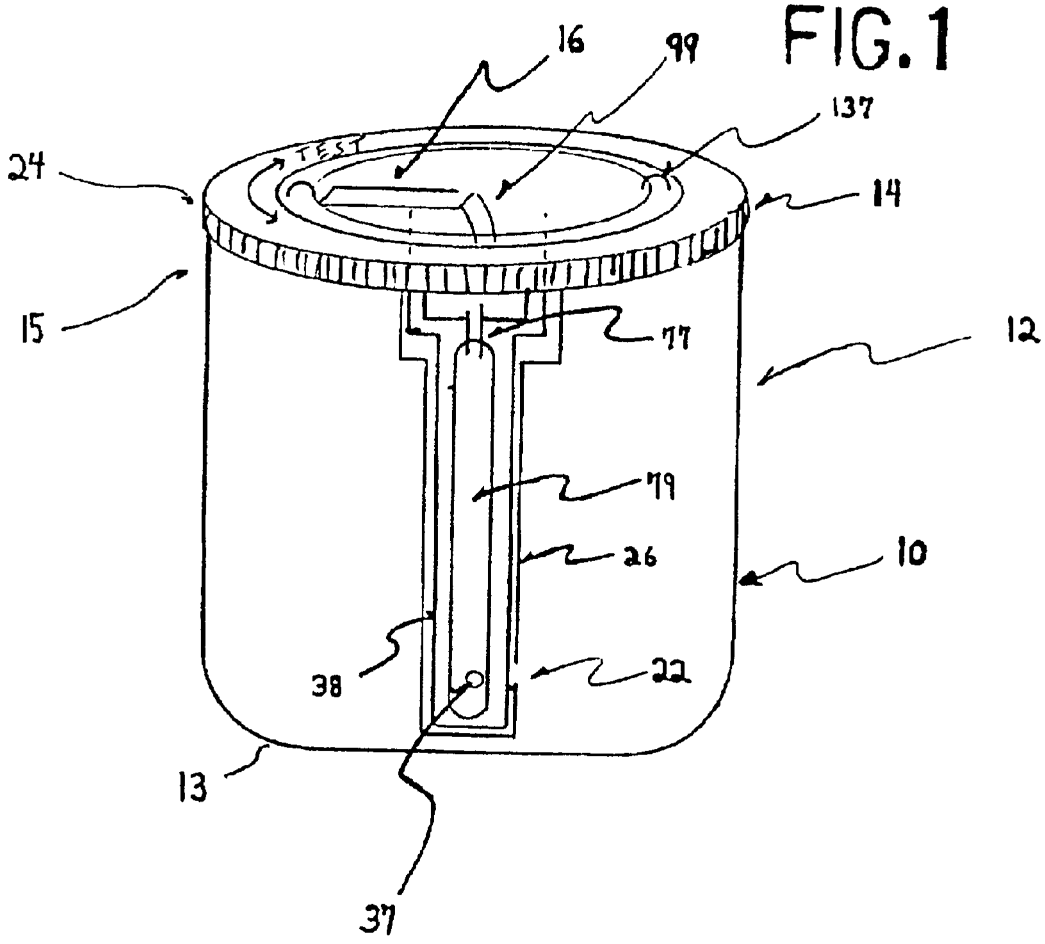
FIG. 1 is a perspective view of a self-contained, tamper-proof screening apparatus in accordance with the present invention.

In describing a preferred embodiment of the invention, specific terminology will be selected for the sake of clarity. However, the invention is not intended to be limited to the specific terms so selected, and it is to be understood that each specific term includes all technical equivalents that operate in a similar manner to accomplish a similar purpose.

The terms “right”, “left”, “top”, “bottom”, “lower” and “upper” designate relative directions in the drawings to which reference is made. The terms “inward” and “outward” will usually refer to an area inside or outside of a particular structure.

Preferred embodiments of the present invention will now be described in detail with reference to the accompanying drawings in which an apparatus for testing and screening for specific compounds, in accordance with the present invention, is generally indicated at 10.

Referring now to FIG. 1, an apparatus 10 for testing and screening for specific compounds, and in particular testing for drugs, is shown. The apparatus 10 comprises an outer container 12, a closure 14, and a test cassette 16. The container 12 has a closed end 13 and an open end 15. The container 12 is designed to hold liquid specimen (e.g., urine, blood, etc.) that is placed or poured into it. The container 12 may be one of a number of standard specimen containers currently on the market.

The closure 14 is adapted to securely attach to the container 12 providing a liquid-tight seal between the closure and the container. The closure 14 may be snapped on, screwed on, frictionally engaged or secured by some adhesive to the open end 15 of the outer container 12.

In one embodiment, after the specimen is placed in the container, tamper-proof tape, 18, or other tamper prevention mechanism, may be placed across the closure 14 and container used to indicate whether the closure has been removed or separated from the container.

Referring now to FIG. 2, a cross-sectional view of the closure 14 is illustrated. In a preferred embodiment, the container 12 and closure 14 have mating threads **18*a* and 18*b*, respectively, so that the closure 14 may be screwed onto the top of the container 12. This permits a quick and easy means of securing the closure 14** to the container. Of course, other methods for securing the closure to the container may be used (e.g., a snap top closure similar to prescription bottles, rubber O-ring with a mating channel, etc.).

The container 12 need not have a cylindrical shape. If the container has a square or triangular cross-section, a snap top or adhesive may be used to secure the closure 14 to the container 12.

The threads **18*b* of the closure 14 are located on a head section 24 of the closure 14. As can be seen in FIG. 1, the head section 24 is preferably shaped to fit over the container 12. In the preferred embodiment, the container 12 has a cylindrical shape; accordingly the head section 24 of the closure 14 will have a circular shape to close and seal the open end 15 of the container 12; this will ensure that the specimen stored in the container 12** will not leak out.

The container 12 need not have a cylinder shape. If the container has a square or triangular cross-section, a snap top or adhesive may be used to secure the closure 14 to the container 12.

The container 12 must be large enough to hold enough liquid specimen so that a testing lab can conduct at least one test and preferably several tests. A more detailed description of the reasons why it is desirable for the container to hold enough specimen to perform several tests will become evident after a reading of this disclosure.

The test cassette 16 is designated to be inserted into and removed from the closure 14. The test cassette holds one or more test strips 20 that are, at some point in time, exposed to the liquid specimen and change color to indicate the presence or absence of a specific compound or compounds.

Referring again to FIG. 2, the closure 14 includes a lower shaft 26 that extends from the head section 24, and is designed to be inserted into the container 12. The shaft 26 is tubular and defines and interior chamber 28. The shaft 26 has a closed distal end 25 and an inlet 22 near said distal end 25.

The shaft 26 should be long enough so that the distal end 25 (i.e., the end furthest from the closure 14) is ensured to be submerged into any liquid specimen stored in the container 12, but the shaft 26 should be short enough so that the shaft does not engage the closed end 13 of the container 12 when the closure is secured to the container 12.

In one embodiment, the shaft 26 has a circular cross-section. It would be evident to one skilled in the art, after reading this disclosure, that the shaft 26 may have a rectangular (including square), oval or other cross-sectioned shape.

In one embodiment, the diameters of shaft 26 and pipe section 38 may be increased in order to minimize their linear length. This allows the closure and cassette to be used with any manufacturer’s container.

An inlet 22 is positioned near the bottom end of the shaft 26, as illustrated in FIGS. 1 and 2. The inlet 22 defines a passageway from the volume outside of the shaft 26 to the interior chamber 28 of the shaft. When a liquid specimen is present in the container, the inlet 22 allows a sample of the specimen to enter through the wall of the shaft 26 into the interior chamber 28 and eventually exposing a test strip 20 in the test cassette 16 to the liquid specimen. Other purposes of the inlet 22 and its position on the shaft will become more evident after a complete reading of this description.

Referring now to FIG. 3, an enlarged cross-sectional view of one type of the cassette 16 is illustrated. The cassette 16 comprises a cover 34, a top section 36, a body section 33, and a pipe section 38. As illustrated, the pipe section 38 has a valve opening 37. The outer diameter of pipe section 38 must be slightly less than the diameter of the interior chamber 28 of shaft 26 of the closure 14; this permits the pipe section 38 to slide into the interior chamber 28 of the shaft 26. The pipe section 38 is designed to engage the interior side of the shaft 26 and rotate within the interior chamber, but still provide a friction fit that prevents any of the specimen from moving between the interior side of the shaft and the exterior side of the pipe section 38. Detents 31 on the exterior side of the pipe section are designed to align with depressions in the shaft for locking the cassette 16 into place and aligning the cassette 16 relative to the closure 14.

The valve opening 37 of the cassette opens into inner cavity 39 of the pipe section. The interior cavity 39 allows the valve opening 37 to communicate with the top section 36 of the cassette 16.

A test strip 20 (preferably a rapid test strip) is positioned proximate the top section 36 of the cassette 16 and is sandwiched between the top section 36 and the cover 34, as illustrated in FIG. 3. In order to allow a technician a view of the test strip and determine the results of the test, the cover 34 is clear (or at least the portion of the cover that overlies the test strip).

Referring now to FIG. 7, the cover 34 may also be designed with a magnifying window 84 that enlarges the appearance of any markings or colors on the test strip 20. The cover may contain indicia 85 to identify the type of test strip or the metabolites or compounds the test strip will screen. Other indicia on the cover may identify the patient, indicate the series of the particular test, identify the lab and its location or provide other instructional or even marketing information. The cover 34 may also provide a place for the patient to sign his or her name.

As will be discussed herein, the cassette is designed to rotate with respect to closure 14. The cover 34 is securely attached to the top section of the cassette to prevent tampering of the test strip 20 and to ensure that the cassette rotates when a technician turns the cassette cover 34. Accordingly, the cover 34 may include a pair of gripping ears 137 which allow a technician to more easily rotate the entire cassette.

The cassette cover 34 may be sealed onto the cassette 16 during manufacturing. The cover 34 will prevent any leakage or contamination of the specimen once the test is activated. The cover also protects the test strip and prevents tampering of the test strip.

Although FIG. 3 only illustrates an apparatus 10 utilizing a single test strip, multiple strips may be included. Further, each test strip 20 may be designed to test for one drug, a plurality of drugs and/or biological organisms or any application where a test strip may be applied (i.e., micro toxins). The subject invention may be used independent of a test strip (e.g., to store and transport a specimen).

Referring again to FIGS. 1 and 3, the test strip 20 is bent or flexed at a point designated by reference numeral 99. The test strip is in a vertical position at its lower end (i.e., inside the pipe section 38 of the cassette 16) and in a horizontal position at its upper end (i.e., the portion sandwiched between the cover 34 and the top section 36). The flexing can take place in or around the colloidal gold section of the strip. It is desired to have the viewing portion of the strip relatively flat; this allows the technician to clearly view the test results through the cover 34.

In a preferred embodiment, the test strip 20 extends into the inner cavity 39 of the pipe section 38 and is bent so that a top portion of the test strip lays in the horizontal plane. In this embodiment, it is preferable to use a lateral flow colloidal gold test strip. Also, by flexing the test strip 20 the lateral flow is enhanced by microscopically stretching (i.e., elongating) the spherical pores of the test strip membrane in the lateral direction of the flow of any specimen at the point of flexing. The flexing of the test strip is just one feature of the subject invention.

Referring now to FIG. 5, a collar 52 having a living hinge 56 may be used to align the test strip 20 inside the inner cavity 39. The collar ensures that the test strip is bent at an appropriate angle and remains substantially in the center of the inner cavity 39 of the pipe section 38 as illustrated in FIG. 3.

Referring again to FIG. 3, in addition to aligning the test strip 20, the collar 52 acts as a barrier that prevents contamination of the area above the collar 52 (i.e., proximate the active region of the test strip). This ensure that the test strip 20 is exposed to a controlled or desired quantity of specimen.

The living hinge 56 of the collar is designed to apply controlled pressure on the test strip 20. In prior art test cassettes, the test strip lays in a horizontal plane secured to a test bed; the technician places a few drops of a specimen onto the sample area of the cassette. The prior art cassette's interior has small protruding platforms that apply pressure to the test strip. The pressure is required to improve the functionality of the test strip (i.e., the test strip is made from many layers of material and many different chemicals which tend to separate if not for the exterior pressure). In the present invention, the collar 52 replaces the need for protruding platforms or other similar structures in prior art cassettes.

Although the test strip material (preferably without the chemically reactive portion) may extend vertically to the bottom of the inner cavity 39, it is preferable to have the test strip overlap an absorbent wick 78. (See FIG. 3 again.) The absorbent wick is more efficient at moving the specimen upwards toward the active portion of the test strip 20.

Referring again to FIG. 5, the area the portion of the test strip 20 above the collar 52 and the cover 36 will be protected from contamination by the specimen. The only way the specimen can contact this area is by migrating through the test strip by means of capillary attraction.

Referring now to FIG. 4, an alternate embodiment is shown. This embodiment illustrates a specially designed absorbent pad 79 that eliminates the requirement of a collar 52 and absorbent wick 78. The absorbent pad 79 grips the test strip for the purpose of positioning the test strip, provides the needed pressure that improves the performance of the chemical portion of the test strip, and wicks the specimen up to the test strip 20.

This absorbent pad 79 also helps position the test strip during assembly. The absorbent pad 79 includes at the upper end a collar 77 somewhat similar to living hinge 52. The collar 77 will provide pressure on the test strip when the collar is inserted into the cassette. The collaris designed to provide a more controlled wetting of the test strip.

The absorbent pad in FIG. 4 prevents excess liquid from washing onto the test strip membrane region. It may be desired to have a testing apparatus that is not in the upright position or in the case the specimen has spilled, the absorbent pad will control the amount of sample onto the test strip. It may also be used as a filter or buffer (adding a reagent) to work in connection with the strip. The absorbent pad 79 may be chemically treated or coated to provide additional flexibility to the testing apparatus. This treatment of the absorbent pad may provide a reagent mix to the sample at the appropriate time.

In another embodiment, the test strip may have an extended absorbent section that extends to the distal end at the inner cavity 39 thereby replacing the absorbent pad. The cassette's inner cavity 39 may be geometrically similar to that of the strip (rectangular), thus allowing the test strip to fit into the cassette in a more controlled fashion.

The portion of the test strip that lays against top section 36 may terminate with an absorption pad. The absorption pad assists in the wicking process and may also absorb any excess specimen that may have been wicked up to the chemically reactive portion of the test strip.

Rails 120 may be incorporated in the top section 36 of the cassette to position the test strip and enclose the absorption pad. A gully 92 may be positioned on the top section 36 to accommodate the absorption pad. The rails 120 also help to prevent the lid 34 from compressing the test strip by maintaining a safe distance between the lid 34 and the top section 36. By maintaining a safe distance, the specimen will not contact the viewing area where it may stain, block or distort the reading of the test strip.

Referring now to FIGS. 2 and 3, primary detents 55 of the cassette will seat into the arcuate grooves 54 of the closure 14. These will provide snap stops and control the distance that the cassette 16 can rotate relative to the closure 14, thus guaranteeing proper positioning of the closure and cassette during activation.

Specific features of the subject apparatus 10 will become apparent through the explanation of a screening for drug metabolites in a urine specimen. Cassette 16 may be snapped into closure 14 at the manufacturer or may be snapped in by the testing personnel. Closure 14 may have lips 51 that provide a snap fit. The cassette 16 is uniquely designed to cooperate with the closure.

In this example, the test strip is pre-positioned in the cassette and the cover 34 is secured to the top section 36 of the cassette.

The exterior wall of pipe section 38 abuts the interior wall of shaft 26. Initially, valve opening 37 is not aligned with inlet 22. The test subject places a sample of his urine in the specimen container 12. Closure 14 is screwed onto the top of container 12. If desired, a tamper-proof seal (not shown) may be placed over the edge of the closure 14 and the outside of the container 12.

When the closure 14 is initially secured to the container, inlet 22 is closed off by the friction fit of pipe section 38 against the interior side wall of shaft 26, accordingly, the specimen within the container 12 is isolated from the interior cavity 39 and from the test strip 20. The container 12 is totally self-contained and there is no reason for a technician in the local lab to open the closed container 12. The container may be shipped to a remote lab in this condition.

The drug test or drug screening in this example is activated by rotating the top section 36 of cassette 16 relative to the closure 14. The ears 137 may be pushed in the desired direction (i.e., clockwise or counterclockwise) by a technician. When the cover 34 and top section 36 are rotated, the cassette's pipe section 38 is also rotated and the valve opening 37 in the cassette will eventually align with the inlet 22 of the shaft 28. As the top section of the cassette rotates with respect to the stationary closure 14, the detents 55 move in an arcuate direction within the grooves 54. The arcuate length of the grooves 54 determine the total amount of the rotation of the cassette 16. After about a third of a turn, detents travel from one end of the grooves 54 to the opposite end, and the valve opening 37 aligns with the inlet 22 of the shaft. If the container contains a liquid specimen, when the alignment of the valve opening with the inlet occurs, the inner cavity 39 of the cassette is flooded with the specimen.

The test strip absorption section is located within the inner cavity 39. When the liquid specimen comes in contact with the absorption material 78, the liquid is wicked upwards toward the test strip 20. When the specimen reaches the flexed area 99, the flow becomes more efficient and eventually delivers an amount of specimen that activates the test strip 20. The horizontal portion of the test strip 20 is readable through the cassette cover 34 and the results of the test are readily ascertainable.

The collar 56 that fits around the test strip may be designed to prevent excess specimen from entering the viewing area. The cassette's design provides an air lock to keep unwanted sample material from contaminating the chemistry section of the test strip. (Similarly, if the cover 34 is removed, accidentally or otherwise, the air lock prevent the specimen in the container from being contaminated.)

Not shown are small vent openings in the upper half of shaft 26 and in the upper half of the pipe section of the cassette. The vent openings may aid in air-to-liquid displacement. The vent openings are usually positioned directly over the corresponding inlet or valve opening so that the vent openings are closed when the inlet/valve opening is closed, and are aligned to let air or liquid in when the cassette is rotated in order to activate the test. Detents may be placed proximate the various vent opening(s), to assist in aligning the cassette with respect to the closure and to ensure a snug frictional engagement between the pipe section and the inner wall of the shaft of the closure 14.

In another embodiment of this invention, illustrated in FIGS. 6A and 6B, a plug 70 may be adapted to snap into the interior chamber 28 of the shaft 26 via knobs 98 thereby isolating the interior chamber 28 from the specimen in the container. The plug 70 includes a control opening 72 that when the plug is rotated by a cassette, the inlet 22, the control opening 72 and the valve opening 37 are all aligned thereby allowing the specimen to enter the inner cavity 39 of the cassette. By using the plug 70, a technician can sample the container's specimen and without exposing the technician to an open container.

In an embodiment that utilizes the plug 70, the pipe section 38 of the cassette 16 may include a key that matingly engages a key opening 93 in the plug 70. Key opening 93 in plug 70 will ensure proper positioning of the cassette with respect to the closure, and will prevent the cassette from being removed prior to sealing the inlet, thereby preventing any of the specimen from spilling out.

Referring again to FIG. 6A, the plug 70 has a unique key opening 93. This plug will be placed near the bottom end of the shaft to seal the inlet 22 in the closure if a cassette is not shipped with the closure or will be used at a later time. The key 93 may help align the plug 70 within the shaft of the closure and will only allow a mating cassette to turn the plug 70. With the plug 70 in place, the closure can function as a standard lid completely sealing the container 12. A cassette 16 may be inserted into the closure at any time to test the specimen stored in the container.

By using this special keyed plug 70, multiple test cassettes may be introduced to sample the same specimen sealed within container 12 without contaminating the specimen. The test cassettes 16 will snap into the closure and the plug; the cassette will not be activated until the cassette is rotated and the valve opening 37, inlet 22 and plug opening 72 are all aligned (i.e., all three holes must be in proper position to allow the specimen from continuing to enter the inner cavity 39).

The utilization of this keyed plug 70 offers more flexibility to the subject invention by providing a means to perform different tests on the same specimen in the sealed container by interchanging the test cassettes. It may be desired to have a sample sealed in a container and after the sample is sent to the lab a technician can decide which test cassette to use. Also, when a positive test comes back, the local testing lab will usually have to send the specimen to a more sophisticated, usually remotely located lab. This can easily be done by twisting the cassette in the opposite direction thereby closing inlet 22 with plug 70, and removing the cassette, this procedure reseals the container and shipping the container can be shipped to the remote lab without spilling or contaminating the specimen. The technician at the remote lab may conduct the same test by inserting a fresh cassette into the closure, rotating the cassette in the appropriate direction thereby allowing specimen to flow through inlet 22 and into inner chamber 39. Additional tests may be performed by inserting additional cassettes having the same or different test strips.

Another embodiment (not shown), would be to utilize a plug that will receive the test cassette and instead of rotating the cassette, when the cassette 16 is placed into the closure 14, the plug is forced downward and opens the passageway for the specimen to flow into the cassette. This embodiment would not require an operator to rotate the cassette, but only to insert the cassette into the closure. It would also allow the container and closure to be shipped and used independently of the test cassette. Only at the time of testing will the cassette be introduced.

The typical use of a chemical reagent test strip includes positioning the test strip into a specimen in a small open container, where the test strip remains in a vertical position, or with the use of a holder a few drops of a specimen are placed onto the holder's sample section, with the entire test strip in a horizontal position.

Referring again to FIG. 3, a collar 52 provides a slight pressure to enhance the function of the test strip and to protect the active or upper section of the test strip from contamination. In this particular design there is a airlock that also protects the upper portion of the test strip from contamination An aspect of the invention is that once the closure and the built-in test cassette are secured to the container 12, a sample specimen in the container can be tested without opening the container. Another aspect is that it provides a means for test personnel to have physical control over the cassette and to physically activate the test when desired. This reduces the opportunity for the person being tested to tamper with the test procedure. Also, the present invention allows the sample specimen to be isolated from the test area after the results are read.

It is also designed to provide a leak proof seal between the outer walls of the cassette and the inner wall of the closure. If desired the inlet 22 can be adapted with a keyed plug (FIG. 6) to prevent the closure from leaking if the cassette is not adapted to the closure. It maybe desired to use the container and closure without a cassette or it may be desired to use multiple cassettes with one container. The keyed plug provides means to sample the specimen with a cassette or use the container and closure without a cassette.

If one test stripe is used the window will start at the near center and go outward. If more than one strip is used the window may consist of the entire diameter of the surface.

On the underside of the cassette cover there is a grove that helps position the test strip and positions the test strips absorbent well. The grove may be deeper at the outer edge to encapsulate the heavier absorbent material.

Represents the body of the cassette and the snaps that seal the cassettes cover to the cassette.

There may be an additional hole in both the cassette and closure that also are aligned when the test is activated. These additional holes are for the purpose of venting, providing air to specimen displacement. They would be placed in the upper portion of the cassettes shaft.

Figure 13:
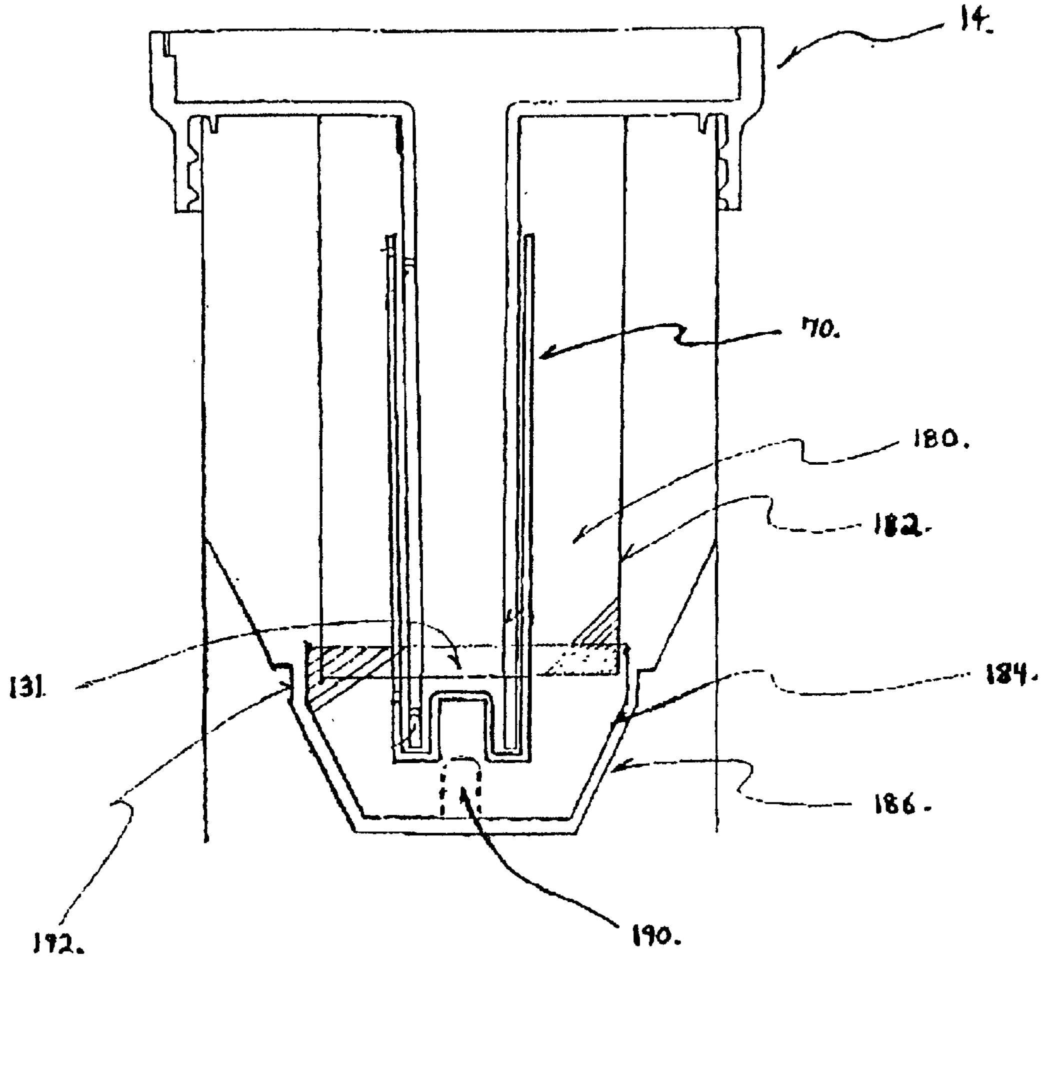
FIG. 13 is another embodiment of the testing apparatus disclosing a second, separate inner container, that isolates a portion of the specimen from the specimen in the outer container.

The subject invention illustrated in FIG. 13 provides means to isolate the tested specimen from the remaining specimen. This may be desired in cases where there may be legal ramifications that may imply that the tested sample has potential to contaminate the remaining sample. THIS ISOLATOR SYSTEM INCORPORATES A SECOND CONTAINER WITHIN THE FIRST CONTAINER. In areas like the Drug of Abuse screening, if a positive result is recorded, the remaining sample is sent to an outside laboratory for verification. By incorporating the Isolator System into the container, there can be no allegation that the remaining sample has been contaminated. It is important to note that even though FIG. 13. shows the Isolator System having a round shape and shaft section, the Isolator System may have a rectangular shaped shaft and complimentary cone shapes or any other desired shape, to work with other test cassette configurations that may already be on the market, including the type that use a card type tester that dips into the cup through the lid.

The preferred embodiment of the Isolator System is shown in FIG. 13. When closure 14 is placed onto a filled specimen cup with a tapered bottom 186 the specimen will fill up the cone section of the cup first. As the closure 14 is placed into the cup the specimen will also seeks its level inside of the isolator shaft 182. When the closure 14 is sealed onto the cup the cone section 184 of the Isolator System will snap around the shaft section 182 of the Isolator System sealing a portion of the specimen inside of the inner-most container 180 from the outer most container. It may be desired that the cone section 184 and the shaft section 182 of the Isolator System do not lock or snap together until the introduction of a cassette. At such a time the cassette would force downward the plug/cover 70 when the cassette applied pressure to plug/cover 70 seat 131. The downward motion would then move the cone 184 by the cone extension 190 and snap and lock onto the shaft 182 of the Isolator System. Depending on the desired configuration the cone section 184 of the Isolator System may be attached by friction to the bottom of the cup 192. If the cone section 184 of the Isolator System is connected to the shaft section 182 before the specimen cup is used then windows or opening (not shown) must be used in the shaft 182 and cone 184 of the Isolator System. The windows may be in the open position when the closure 14 is placed onto to cup. The windows can be closed by the introduction of a cassette which would slide the plug/cover 70 downward, which would slide the cone 184 downward by forcing probe 190 on cone 184 downward. Or the windows can be closed by the exact opposite, thus the cone 184 can hit the bottom of the cup when the closure 14 is put onto the container. The cone 184 would then be forced upward closing off the windows in both the shaft 182 and cone 184 of the present invention. In the alternative, it should be noted that the windows can in the closed position and opened by the cassette. There may be applications where it is desired to mix the contents of the the inside container 180 with the contents of the outer container.

Figure 8A:
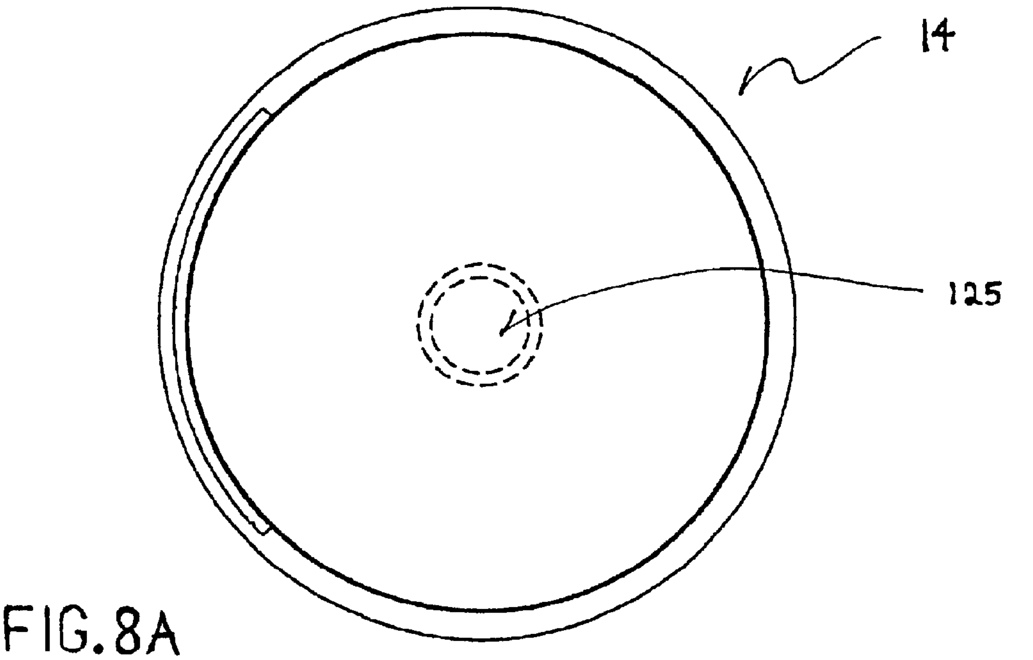
FIG. 8A is an enlarged top view of closure.
Figure 8B:
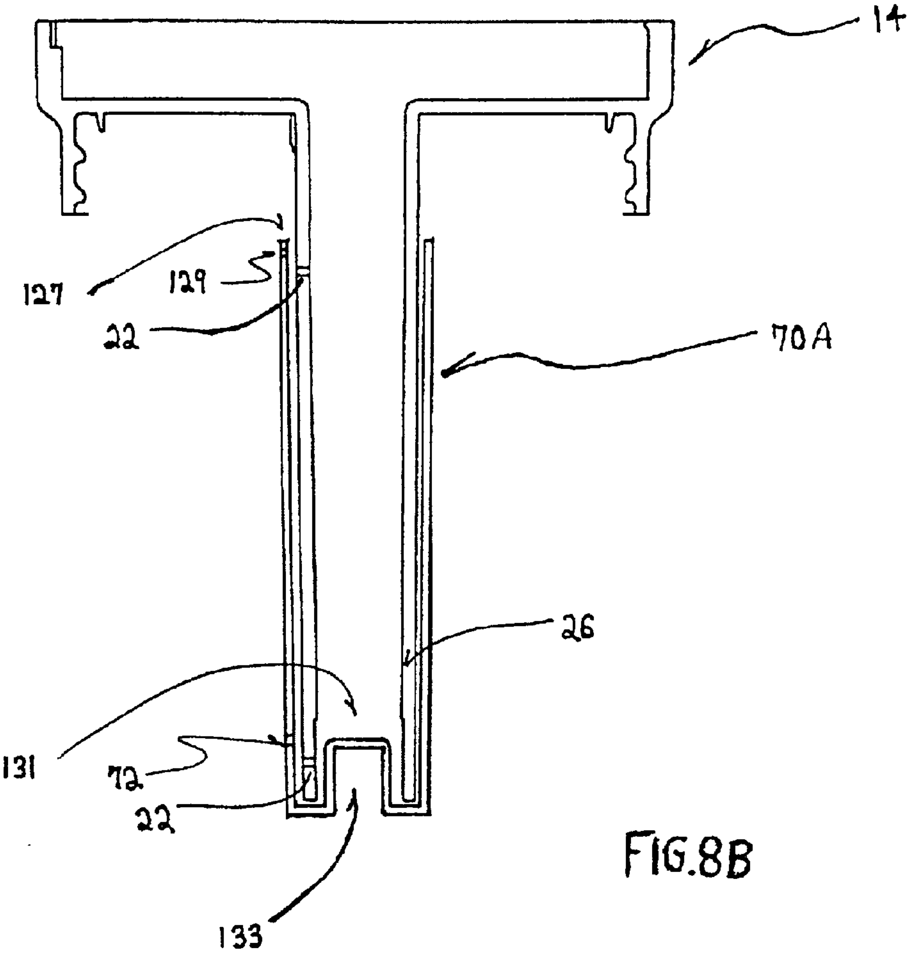
FIG. 8B is a detailed view of cover plug adapter to closure shaft which is sealing the closure inlets and bottom opening of closure.

14. Top view of closure
125. Top view of closure sealed off by cover
127. Alignment control grove in cover
129. Upper window in cover
22. Upper window in closure
131. Interior landing area of bottom plug
72. Lower window of cover
133. Outer area of bottom plug
70. Cover/plug
26. Lower shaft of closure Referring now to FIG. 8, an elongated cover 70A may be adapted to the closure/system 14, that will seal the entire lower shaft 26 of the closure in the absence of a cassette. The elongated cover 70A performs many of the same functions of the plug 70 which was described in FIGS. 6A and 6B.

The elongated cover 70A is not keyed, although when a cassette is introduced into the closure's shaft the bottom plug 133 of the cover 70A is forced downward when the cassette pushes on the landing area 131 of the cover 70A; simultaneously the entire cover is slid downward aligning the windows 129 and 72 of the cover 70A relative to the gates inlets/outlets of the closure 14. In this position, the sampling/testing apparatus will function as normal, thus by rotating the cassette/dial, the gate of the cassette, the gate of the closure, and the windows of the cover will all be aligned and the sample specimen will inter into the inner chamber/cassette.

The windows 129 and 72 of the cover are also designed to mate with an insert or filter if desired. The windows 129 and 72 may also be meshed to prevent unwanted sample specimen from entering the inner chamber during activation. The cover 70 may also have an alignment control 127. This will align the cover 70 in the proper position when it is adapted to the shaft of the closure. Also, the bottom plug 133 of the cover may incorporate a locking mechanism (not shown) that will latch onto the bottom of the cassette so that when the cassette is removed the cover will be pulled upward and reseal the entire system by closing off windows 129 and 72 relative to the closures gates/inlets 22.

Figure 9:
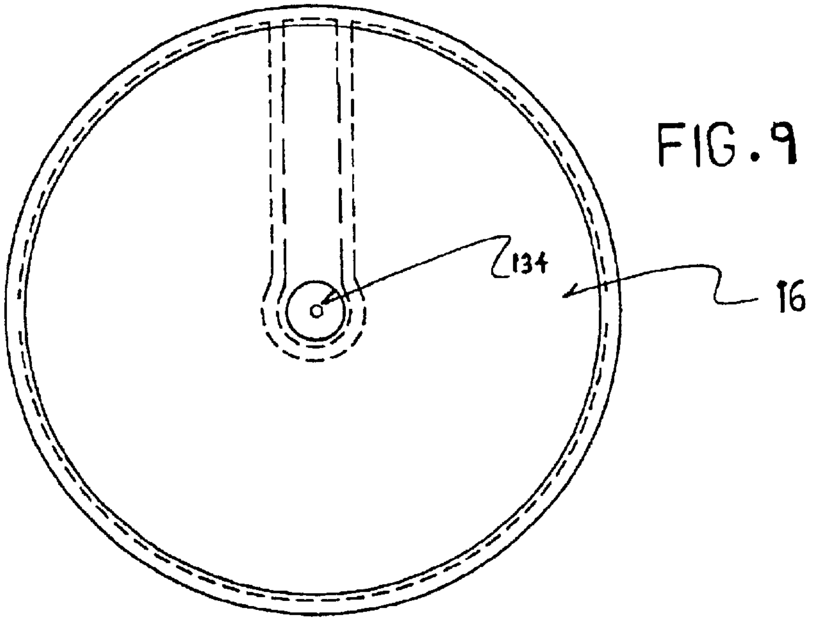
FIG. 9 is a top view of another embodiment of a cassette having a tapered interior bottom.

FIG. 9. Top View of a cassette with a tapered interior bottom

134. Interior bottom point of cassette

16. Top view of cassette

Figure 10:
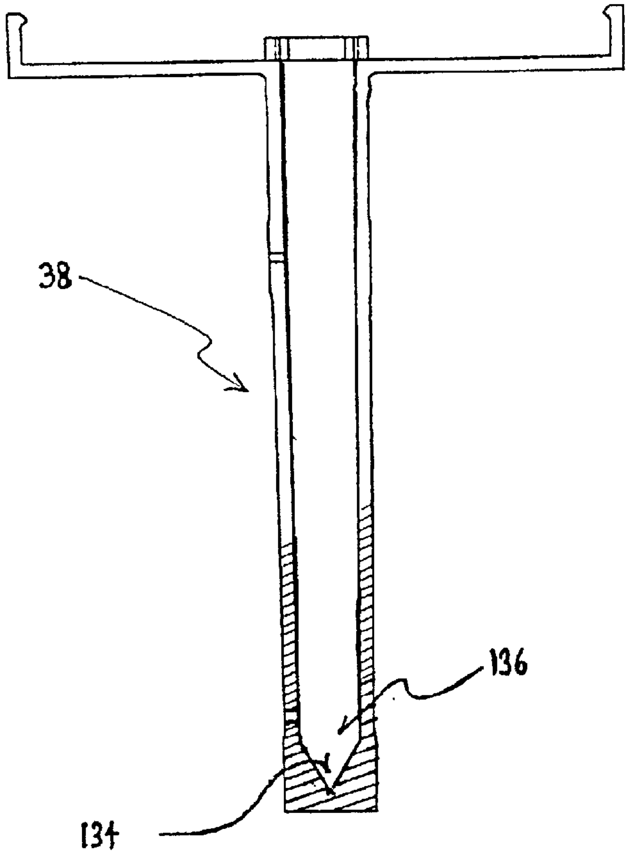
FIG. 10 is a cross-sectional view of the cassette of FIG. 9 showing the tapered interior forming a point.

FIG. 10. Another embodiment of a cassette with a tapered interior forming a pointed bottom.

38. Lower shaft of a cassette

134. The tapered interior of the bottom portion of a cassette forming a pointed bottom.

136. The interior of the cassette, which encloses a tapered test strip in FIG. 11.

FIG. 11A. Special test strip with a tapered lower portion, designed to fit into a tapered cassette or other tapered container.

Figure 11:
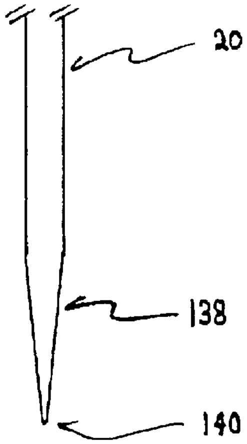
FIG. 11 is a special test strip with a tapered lower portion, designed to fit into a tapered cassette or other tapered container.

The cassette and test strip as illustrated in FIGS. 10 and 11 is designed for times when there is only a small amount of a specimen and/or additional reagents added to a test strip. By forming a tapered bottom in a chamber the samples will be focused into a small location thus assuring that the entire volume may be absorbed into or through the tapered test strip.

All known test strips are designed with a flat bottom. The test strip in accordance with the present invention is particularly useful when very small amounts of sample specimen are available or desired. There are several test performed in the lab that require a sample specimen and then a few drops of one or more chemical reagents to the absorbent area of a test strip. By incorporating this special cassette in FIG. 10 and test strip in FIG. 11 the Sampling apparatus can be designed to receive multiple samples and or reagents that can all be focused on the tapered portion of the test strip allowing each to be absorbed through the test strip. This will allow the system to be used for numerous applications such as an HIV, STD's, bacteriological, chemical or urinalysis testing just to name a few.

20. Test strip

138. Tapered portion of a test strip.

140. Pointed end of test strip, designed to fit into a tapered chamber.

Figure 12A:
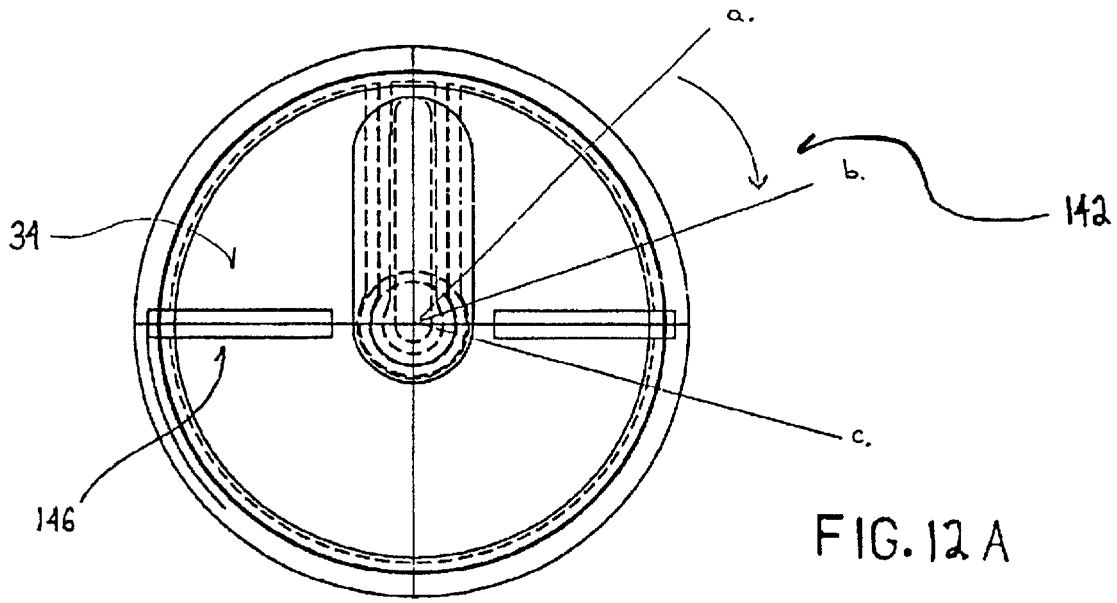
FIG. 12A is a top view of the testing and sampling apparatus embodiment indicating multiple testing positions incorporated into a single test.

Referring to FIG. 12A, a top view of another embodiment of the testing and sampling apparatus using multiple test compartments incorporated into a single test. A cassette cover with viewing window and finger grips 146 is illustrated. They finger grips 46 are used to rotate the cassette in order to receive multiple samples and or reagents into the cassette's chamber.

Reference positions 142 represent the multiple positions to which the dial may be adjusted to during a test. In this case position a. b. and c.

Figure 12B:
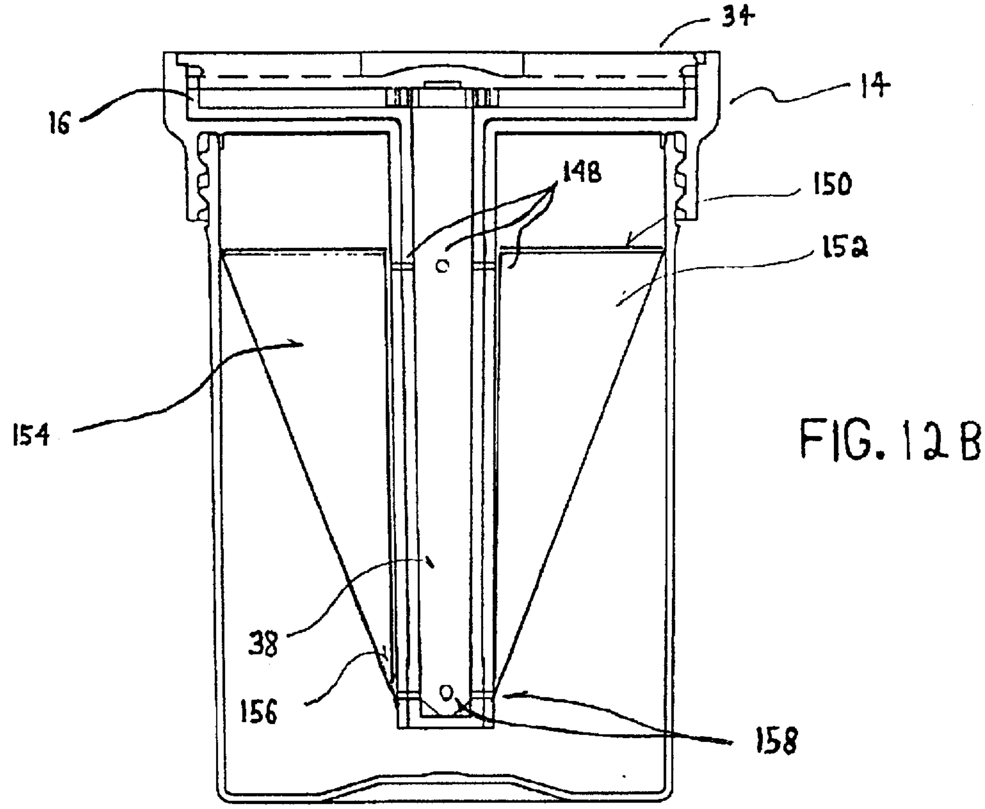
FIG. 12B is another embodiment of the sampling and testing apparatus, which is adapted to a container that has multiple chambers, built into the container.

Referring now to FIG. 12B, another embodiment of the sampling and testing apparatus, which is adapted to a container that has multiple chambers, built into the container. This embodiment may also be designed to be built as an insert that is attached to the shaft 26 of the closure 14.

It may be desired to incorporate a multi-chambered container to the testing apparatus. There are many applications where more than one sample or reagent may be desired as part of a testing assay. Providing a multi-chambered container allows the operator to rotate the finger grips 146 on the cover 34 of the cassette into multiple positions, a, b, c etc. When the cassette is properly aligned to the various inlets 148 and 158, which are aligned to separate chambers, the contents of each chamber will be introduced into the center cassettes chamber. If a test strip is being used in the cassettes chamber the samples or reagents can be control to meet the required testing procedure. In this case there are tapered chambers 154 and 152 that focus their contents to a small point 156 in the bottom of their chambers. An example of a test that may utilize a multi-chambered insert or container may be to incorporate a large window that allows a whole blood sample to be applied directly onto an absorbent or test strip. Then afterwards placing the closure with cassette into an multi chambered container. At this point the sample may be treated with reagents and eventually designed to give a visual reading of a test result.

16. Cassette

34. Cassette cover

14. Closure

Multiple openings 148 may be used as vents to displace the contents of inner chamber when contents of outer chamber enter. The inlets of the outer chambers and the closure shaft are fixed. When the cassette is rotated to the aligned position the vents or the inlets/gates will allow interaction or communication between the chambers.

158. Gates or inlets

152. Chamber

154. Chamber

150. Sealing lid for each chamber

38. Shaft of cassette

156. A tapered bottom to collect small samples in a focused location

An apparatus for isolating a sample of a liquid specimen and testing said sample without contaminating the remaining liquid specimen is illustrated in FIG. 13. The apparatus includes an outer container having a first end that is open and a second end that is closed, the outer container being capable of holding a liquid specimen; a closure having a top side and a bottom side, the bottom side facing the interior of the container, the closure having means to releasably attach to the first end of the container, the closure includes an elongated tube that extends away from the closure and into the container, said tube having an isolator bottom attached to the distal end of the tube, the isolator bottom having at least one window for allowing at least a portion of any liquid specimen stored in the outer container into the interior of the tube, the closure communicates with the bottom of the outer container via said tube and isolator assembly to close said window in the isolator bottom, when said window is closed the tube and isolator bottom define an inner container within the outer container for isolating said at least portion of the liquid specimen from any liquid specimen present in the outer container.

Continuing to refer to FIG. 13, the apparatus further includes a shaft having a hollow interior and a distal end that is designed to extend inside said tube from the closure towards said second end of the outer container, the distal end attached to an isolator bottom that partially seals off said distal end, the isolator bottom having at least one window that defines a passage from the exterior of the shaft to the hollow interior of the shaft, the hollow interior of the shaft communicates with the closure, thereby relating a pathway from a point within said inner container to the top side of the closure;

an elongated shaft cover having a first end and a second end, said second end of the shaft cover being closed off, said shaft cover having an interior dimension slightly larger than the exterior dimension of the shaft so that the shaft cover functions as a sheath over said shaft and has an initial position that sealedly isolates the interior of the shaft from the interior of the tube;

wherein said elongated body section has a sufficiently long longitudinal dimension such that it engages the closed end of the shaft cover before the test cassette is secured to the closure so that when the test cassette is secured to the closure said elongated body section applies a longitudinal force to the shaft cover thereby moving said shaft cover in said pre-determined manner.

Although this invention has been described and illustrated by reference to specific embodiments, it will be apparent to those skilled in the art that various changes and modifications may be made which clearly fall within the scope of this invention. The present invention is intended to be protected broadly within the spirit and scope of the appended claims.

I claim:

1. An apparatus for testing specimens comprising:

a outer container for holding a specimen;

a closure having means adapted to securely attach the closure to the container, said closure having a hollow shaft that projects into the inside of the container, the first end of the shaft attached to the closure and the second end of the shaft distally extending into the container, and the inner walls of the shaft defines an interior chamber, the shaft having at least one inlet proximate its distal end; and a plug cover having at least one window, said plug cover seals off said at least one inlet.

2. The apparatus of claim 1 further comprising an elongated tube that extends away from the closure and into the container, said tube having an isolator bottom attached to the distal end of the tube, the isolator bottom having at least one window for allowing at least a portion of any liquid specimen held in the container into the interior of the tube;

a test cassette having means adapted to securely attach the cassette to the closure but permitting rotational movement of the test cassette relative to the closure, the cassette having a top section and a tubular pipe section that extends from the top section into the interior of the shaft for frictionally engaging the inner surface of the shaft, said cassette communicates with the interior bottom of the plug cover to move said plug cover a predetermined distance in the longitudinal direction such that said plug cover engages the isolator bottom as the cassette is inserted, the plug cover aligns the windows between the shaft and plug cover to expose the pipe section of the cassette to the liquid specimen and closes the windows between the tube and isolator bottom to define an inner container within said outer container for isolating said at least portion of the liquid specimen from any liquid specimen present in the outer container.

3. The apparatus of claim 2 wherein rotation of the cassette aligns the inlets of the pipe section with the previously aligned inlets of both the shaft and plug cover allowing the liquid specimen to enter the interior of the cassette.

4. The apparatus of claim 3 further comprising a test strip secured to the interior of the pipe section wherein said test strip is capable of being exposed to the specimen when the specimen enters the interior of the cassette.

5. An apparatus for testing specimens comprising:

a container for holding a specimen;

a closure having means adapted to securely attach the closure to the container, said closure having a hollow shaft that projects into the inside of the container, the first end of the shaft attached to the closure and the second end of the shaft distally extending into the container, and the inner walls of the shaft defines an interior chamber, the shaft having at least one inlet proximate its distal end; and a test cassette having means adapted to securely attach the cassette to the closure but permitting rotational movement of the test cassette relative to the closure, the cassette having a top section and a tubular pipe section that extends from the top section into the interior of the shaft for frictionally engaging the inner surface of the shaft, said test cassette holding at least one test strip that can indicate the presence of specific compounds.

6. The apparatus of claim 5 further comprising a test strip positioned on the top section of said cassette and extending at least partially into the tubular pipe section, the pipe section having a valve opening that can be aligned with the inlet and for allowing the inlet to communicate with the tubular section of the pipe section and eventually to the top section thereby allowing a portion of the specimen to be directed to the test strip.

7. The apparatus of claim 5 wherein said means adapted to securely attach the closure to the container comprises mating threads that allow the closure to screw onto the container.

8. The apparatus of claim 5 further comprising a collar having a living edge for aligning the test strip within the tubular pipe section and providing a controlled pressure to the test strip.

9. The apparatus of claim 5 further comprising a plug cover having at least one window, said plug cover seals off all of said at least one inlet of the shaft in the absence of the cassette.

10. The apparatus of claim 9 wherein said cassette has at least one gate inlet and designed such that when the cassette pushes on the interior landing area of the plug cover said at least one inlet of the shaft become aligned.

11. The apparatus of claim 10 further comprising gates on the cassettes wherein rotation of the cassette aligns said at least one gate inlet of the cassette with the said at least one inlet of the shaft thereby allowing at least a portion of the specimen into the interior of the cassette.

12. The apparatus of claim 11 further comprising a mesh applied over said at least one window of the plug cover and over all of said at least one inlet of the closure to prevent unwanted particles from entering the cassette.

13. The apparatus of claim 12 further comprising a locking mechanism on the landing area adapted to frictionally engage the cassette such that when the cassette is removed, it pulls the plug cover up thereby re-sealing the closures.

14. An apparatus for isolating a sample of a liquid specimen and testing said sample without contaminating the remaining liquid specimen, the apparatus comprising:

an outer container having a first end that is open and a second end that is closed, the outer container being capable of holding a liquid specimen;

an isolator bottom positioned within the container proximate the second end of the container, the interior of the isolator bottom initially communicating with the interior of the container so that if a liquid specimen is present in the outer container, at least a portion of the liquid specimen would flow into the isolator bottom if a liquid specimen is present in the outer container; and a closure having a top side and a bottom side, the bottom side facing the interior of the container, the closure having means to releasably attach to the first end of the container, the closure includes an elongated tube that extends away from the closure and into the container, said tube having means to engage said isolator bottom, the tube ultimately forming a seal with the isolator bottom to define an inner container within the outer container for storing and isolating at least some of the liquid specimen from said at least a portion of the liquid specimen if present within said inner container.

15. The apparatus of claim 14 further comprising:

a shaft having a hollow interior and a distal end that is designed to extend inside said tube from the closure towards the second end of the container, the hollow interior of the shafi communicates with the closure, thereby defining a pathway from a point within said inner container to the top side of the closure; and an elongated shaft cover having a first end and a second end, said second end of the shaft cover being closed off, said shaft cover having an interior dimension slightly larger than the exterior dimension of the shaft so that the shaft cover functions as a sheath over said shaft and has an initial position that sealedly isolates the interior of the shaft from the interior of the tube.

16. The apparatus of claim 15 further comprising an inlet means located on the shaft and at least one egress means on the shaft cover, said egress means located proximate the inlet means of the shaft the shaft cover being adapted to frictionally engage the shaft so that when a force is applied to the shaft cover, the shaft cover is restricted to movement in a predetermined manner with respect to the position of the shaft thereby aligning the shaft cover inlet with the shaft inlet means thereby permitting a sample of the liquid specimen within the inner container to enter the interior of the shaft.

17. The apparatus of claim 15 further comprising a test cassette having a top section that is adapted to be secured to the top side of the closure, the test cassette having an elongated body section that extends at least partially into said shaft, the cassette having means for testing the sample of liquid specimen that comes in contact with said body section.

18. The apparatus of claim 17 wherein said testing means is a chemically treated test-strip.

19. The apparatus of claim 18 wherein said elongated body section has a sufficiently long longitudinal dimension such that it engages the closed end of the shaft cover before the test cassette is secured to the closure so that when the test cassette is secured to the closure said elongated body section applies a longitudinal force to the shaft cover thereby moving said shaft cover in said pre-determined manner.

20. The apparatus of claim 19 further comprising a keyhole at the closed end of the shaft cover and a mating key at the distal end of the elongated body section so that when the cassette is secured to the closure a rotational force is applied to the shaft cover via the elongated body section thereby moving said shaft cover in a pre-determined manner.

21. The apparatus of claim 14 wherein said means to releasably attach the closure to the container comprises mating threads that allow the closure to screw onto the container.

22. The apparatus of claim 14 wherein said tube has a circular cross-section.

23. The apparatus of claim 22 wherein said isolator bottom is frusto-conical in shape.

24. The apparatus of claim 14 wherein said tube has a rectangular cross-section.

25. The apparatus of claim 24 wherein said isolator bottom is rectangular in shape.

26. The apparatus of claim 14 wherein said tube has an oval cross-section.

27. An apparatus for isolating a sample of a liquid specimen and testing said sample without contaminating the remaining liquid specimen, the apparatus comprising:

an outer container having a first end that is open and a second end that is closed, the outer container being capable of holding a liquid specimen;

a closure having a top side and a bottom side, the bottom side facing the interior of the container, the closure having means to releasably attach to the first end of the container, the closure includes an elongated tube that extends away from the closure and into the container, said tube having an isolator bottom attached to the distal end of the tube, the isolator bottom having at least one window for allowing at least a portion of any liquid specimen stored in the outer container into the interior of the tube, the closure communicates with the bottom of the outer container via said tube to close said window in the isolator bottom, when said window is closed the tube and isolator bottom define an inner container within the outer container for isolating said at least portion of the liquid specimen from any liquid specimen present in the outer container.

28. The apparatus of claim 27 further comprising a shaft having a hollow interior and a distal end that is designed to extend inside said tube from the closure towards said second end of the outer container, the distal end attached to an isolator bottom that partially seals off said distal end, the isolator bottom having at least one window that defines a passage from the exterior of the shaft to the hollow interior of the shaft, the hollow interior of the shaft communicates with the closure, thereby relating a pathway from a point within said inner container to the top side of the closure;

an elongated shaft cover having a first end and a second end, said second end of the shaft cover being closed off, said shaft cover having an interior dimension slightly larger than the exterior dimension of the shaft so that the shaft cover functions as a sheath over said shaft and has an initial position that sealedly isolates the interior of the shaft from the interior of the tube wherein said elongated body section has a sufficiently long longitudinal dimension such that it engages the closed end of the shaft cover before a test cassette containing at least one test strip is secured to the closure so that when the test cassette is secured to the closure said elongated body section applies a longitudinal force to the shaft cover thereby moving said shaft cover in said pre-determined manner.

29. The apparatus of claim 27 wherein said tube has a circular cross-section.

30. The apparatus of claim 29 wherein said isolator bottom is frusto-conical in shape.

31. The apparatus of claim 27 wherein said tube has a rectangular cross-section.

* * * * *